United States Patent [19]

Perez

[11] Patent Number: 4,697,949
[45] Date of Patent: Oct. 6, 1987

[54] PLUG, SOCKET AND PLUG-AND-SOCKET COUPLING THEREOF FOR TEMPORARILY ATTACHING AN IMPLEMENT TO A HANDLE

[75] Inventor: Antonio C. Perez, Barcelona, Spain

[73] Assignee: Firma Vileda GmbH, Weinheim, Fed. Rep. of Germany

[21] Appl. No.: 860,649

[22] Filed: May 7, 1986

[30] Foreign Application Priority Data

May 20, 1985 [ES] Spain ...................................... 286841

[51] Int. Cl.$^4$ ............................................... F16B 1/04
[52] U.S. Cl. .................................... 403/361; 403/192; 403/359
[58] Field of Search ............... 403/361, 354, 341, 305, 403/345, 192, 359, 375, 292, 187

[56] References Cited

U.S. PATENT DOCUMENTS

| | | | |
|---|---|---|---|
| 2,744,674 | 5/1956 | Smith | 403/192 X |
| 2,825,080 | 3/1958 | Bongiovanni | 403/305 X |
| 3,338,604 | 8/1967 | VanBuren | 403/361 X |
| 3,623,753 | 11/1971 | Henry | 403/364 X |
| 3,927,435 | 12/1975 | Moret et al. | 403/322 X |
| 4,224,786 | 9/1980 | Langlie et al. | 403/361 X |
| 4,433,931 | 2/1984 | Malish et al. | 403/361 X |
| 4,642,837 | 2/1987 | Nichols et al. | 403/290 X |

FOREIGN PATENT DOCUMENTS 1399679  5/1965  France ................................ 403/192

Primary Examiner—Andrew V. Kundrat
Assistant Examiner—Joseph A. Fischetti
Attorney, Agent, or Firm—Felfe & Lynch

[57] ABSTRACT

A plug-and-socket coupling temporarily attaches a handle to an implement. The plug has a cylindric plug body with an attachment device on one end for one of the handle or implement. A flange projects radially from the attachment-device end of the plug body and has an annular socket-engaging surface which is normal to the axis of the plug body. A spring strip projects from the flange annularly spaced from the plug body by the socket-engaging surface and parallel to the axis of the plug body. The socket of the coupling has a cylindric, tubular socket body with an attachment device on one end for the other of the handle or implement. The other end of the socket body is received between the plug body and its sprng strip when the plug and socket are coupled. A latching feature on the inside of the spring strip extending transversely to the axis of the plug body cooperates with a latching feature on the outside of the socket body for the temporary attachment. At least two axial notches of different lengths on at least one of the plug body and spring strip cooperate with at least two axial ribs extending radially from the socket body as anti-twisting structures, at least one of the ribs extending farther from the attachment-device end of the socket body than the latching feature thereof.

16 Claims, 7 Drawing Figures

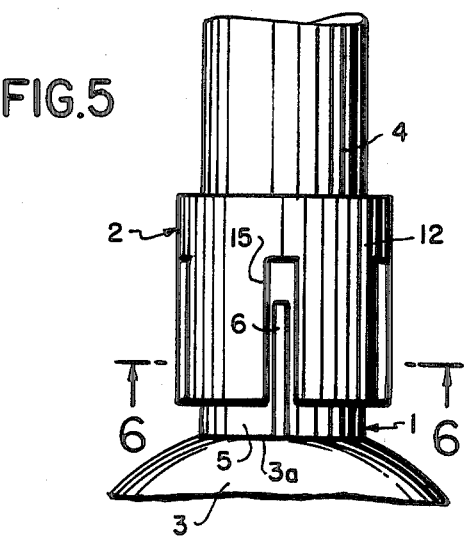
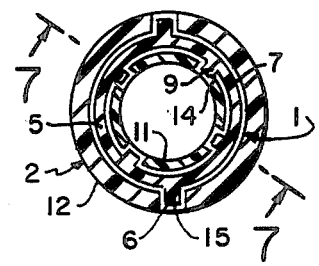
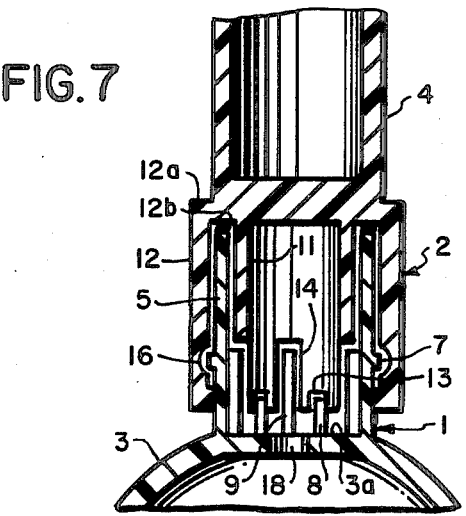

PLUG, SOCKET AND PLUG-AND-SOCKET COUPLING THEREOF FOR TEMPORARILY ATTACHING AN IMPLEMENT TO A HANDLE

BACKGROUND OF THE INVENTION

The invention relates to a plug, a socket, and a plug-and-socket coupling thereof for temporarily, i.e. attachably and detachably, attaching an implement to a handle.

A plug-and-socket coupling for temporarily attaching a broom to a handle is known from Swiss Pat. No. 305,389. It has, however, a large number of parts which must be fitted together in a complicated assembling operation to produce a coupling that is ready for use. The considerable expense which this entails militates against wide use of the coupling. Further, the handling required to use the coupling is less than satisfactory. It requires both insertion of the plug into the socket and actuation of a sliding sleeve. Furthermore, the actuation of the sleeve puts the sleeve in so unstable a position, mechanically, that even normal use of the broom may cause the coupling to come apart accidentally. Still furthermore, compact construction of the large number of parts of the plug-and-socket coupling makes it relatively heavy, which militates against its use with light-weight implements such as a mop, for example.

SUMMARY OF THE INVENTION

An object of the invention is, therefore, to provide a plug, a socket and a plug-and-socket coupling thereof that is simple to manufacture, easy to handle, highly stable and reliable in use, of very low weight and, therefore, universally usable with any kind of implement.

This and other objects are achieved in accordance with the invention by a plug having an attachment device on one end of a cylindric plug body for attaching the plug to an implement (including integrally therewith) or, preferably, a handle therefor such as a broomstick, for example. A preferably-integral flange projects generally radially from the one, attachment-device end of the plug body to provide an annular, socket-engaging surface on the plug-body side of the flange which is substantially normal to the axis of the plug body. The flange and/or its socket-engaging surface may be segmented, but preferable are continuous around the plug body. At least one preferably-integral spring strip projects from the plug-body side of the flange parallel to the axis of the plug body substantially along the length of the plug body and annularly spaced from the plug body by the radial width of the annular, socket-engaging surface of the flange. The inside of the spring strip facing the plug body has at least one latching feature, a rib or, preferably, a detent, substantially spaced axially along the spring strip from the flange and extending transversely to the axis of the plug body. The plug (plug body and/or spring strip) has at least two anti-twisting notches extending axially of the plug body to open ends thereof remote from the flange, the notches being of different lengths from their open ends and the other, closed end of at least one notch being closer to the flange than the latching feature of the plug.

The objects of the invention are also achieved by a socket having a cylindric, tubular socket body. The socket body has an attachment device on one end for attaching the socket to a handle or, preferably, an implement (including integrally therewith) such as a broom, for example. For the intended coupling use with the plug, the inside diameter of the cylindric, tubular socket body is dimensioned to receive the plug body, not snugly, but with only slight spacing and the outside diameter of the socket body is dimensioned to fit in the annular space between the plug body and its spring strip similarly. The other end of the socket body therefore has a plug-engaging surface which is substantially normal to the axis of the socket body so as to engage fully the similarly-arranged socket-engaging surface of the plug when the plug and socket are coupled. The outside of the socket body has at least one latching feature, a detent or, preferably, a rib, closer to the one, attachment-device end of the socket body than its other and transverse of the axis of the sockey body for, of course, axial and radial cooperation with the latching feature of the plug upon coupling. The socket body (inside and/or outside) has at least two axial anti-twisting ribs extending radially from the socket body form at least proximate the one, attachment-device end thereof, the anti-twisting ribs being of different lengths and at least one of the anti-twisting ribs extending farther from the one, attachment-device end of the socket body than the latching feature thereof. The lengths and circumferential locations of the anti-twisting ribs are, of course, selected to cooperate with the notches of the plug in the intended coupling use. Because the anti-twisting ribs are intended to orient the plug and socket rotationally and prevent relative twisting once the plug and socket are coupled, the anti-twisting ribs and notches need not interfit snugly, whereby they do not resist coupling movement of the plug and socket, and, because of their different lengths, only the longer can be worn or damaged by initial misalignment, whereby to protect the structure and function of the other.

The objects of the invention are also achieved by a plug-and-socket coupling thereof which, therefore, requires only two parts: the plug and the socket. Either one can be attached to a handle, and the other, to an implement to which the handle is to be temporarily attached with the coupling. Both the plug and socket can be and preferably are of one-piece construction. The manufacture of the two parts is, therefore, extremely simple and, for preferred embodiments, at least, can be carried out by known injection-molding techniques using thermoplastic materials. Consequently, the manufacturing costs are low.

The plug and socket fit together to form the coupling by relative axial movement therebetween which, preferably, is also axial of a generally-cylindric handle connected to one of them. As they are fit together, at least one of their anti-twisting structures engage each other before their latching features because of their relative locations. This assures that the plug and socket and, thus, the handle and the implement preferably connected respectively thereto are always coupled together in a preset, untwisted relative-rotational condition. A considerable advantage here is that engagement of the anti-twisting structures requires no appreciable expenditure of energy.

The latching structure on the plug comprises the at least one spring strip which is secured at the end of the plug body axially remote from that to be first received in the socket during coupling. The spring strip is coaxially spaced from the plug body relative to the socket body to be in the same position relative to the plug body when the plug is assembled or disassembled from the socket. The spring strip is, therefore, only subject to momentary deformation as the latching features of the plug and socket pass each other during coupling assembly or disassembly. Consequently, it retains its original elasticity permanently, even when it is made of a thermoplastic material.

When the plug is assembled with the socket, the socket- and plug-engaging surfaces of the plug and socket are aligned with each other in a common plane. This is very advantageous from a static point of view, for stability, to avoid an increased tendency of the plug and socket to wobble after extended use.

The spring strip snaps the latching feature on the inside and toward the other end of the spring strip elastically behind a latch surface of the latching feature of the socket, on at least one axial side, and preferably both, when sufficient force is exerted in the assembling direction. Assembly of the two coupling parts thus is extremely simple and does not require the actuation of any additional elements.

Disassembly of the two, plug and socket coupling parts is just as simple. For this, at least one of the latch surfaces preferably makes an acute angle with the other in the axial direction of the disassembly so that separating the two parts also merely requires the exertion of sufficient separating force, generally pull on the handle, which makes for easy uncoupling disassembly. Yet, when the two coupling parts are couplingly assembled, a coupled joint is obtained that is free of any wobble and which readily withstands the stresses imposed by usual use as with a floor-care implement, for example.

Whether the socket is attached to the handle and the plug to the implement or vice versa is often immaterial. In general, however, attaching the plug to the handle and the socket to the implement is preferable.

In the assembled condition, the preferred spring strip substantially surrounds the socket body annularly spaced therefrom slightly and substantially uniformly, such spacing corresponding substantially to the spacing of the inner surface of the socket body from the plug body. These spacings should be so small that ease of assembly is just barely assured, allowing for the usual manufacturing tolerances, deformation in use, any swelling of the materials from which the plug and socket are constructed due to wetting with water, for example, and the like. When the attached implement and handle undergo angular displacement, therefore, the socket is thus mechanically strengthened both by the spring strip and by the plug. This substantially increases the bearing strength of the coupling. To maximize this advantage, the spring strip and the plug should extend substantially the same distance in the axial direction.

Particularly good wear resistance is obtained when the spring strip, the plug and the socket are bounded on at least their respective facing sides by surfaces having rotational symmetry relative to the plug-and-socket coupling. These surfaces are preferably cylindrical to be easy to generate.

The anti-twisting rib or, preferably, ribs on the inside of the socket body, which, in the assembled condition of the two coupling parts, projects into a notch in the plug, is advantageously formed integrally with a base section of the socket extending substantially across the one, attachment-device end of the socket toward which the plug is relatively axially advanced for coupling. The anti-twisting rib then also strengthens the socket from a static, mechanical point of view.

The other anti-twisting rib or, still more preferably, ribs may be disposed on the outer or inner wall surface of the socket body. In the former, outer-wall case, wherein the rib cooperates with the plug via the spring strip, there is the advantage of particularly good mechanical reinforcement of the socket. In the latter, inner-wall case, there is the advantage of a concealed arrangement allowing a smooth outer surface on the socket body which lessens the likelihood of retaining unsightly and, even function-interfering dirt during normal use of the coupling with an implement. Embodiments in which the socket body is provided with ribs both externally and internally are also conceivable. In a sense, they can combine the advantages of both designs because the outer ribs can be smaller than if they were used alone.

The socket is preferably provided with a plurality of such wall-surface ribs, distributed uniformly about its inner and/or outer, axial circumference. The plug and-/or the spring strip then has an equal number of corresponding notches correspondingly distributed uniformly about its circumference. In addition to being an effective safeguard against twisting, this arrangement offers the advantage of stabilizing the plug and socket mechanically against buckling stresses acting from various directions. Very good stability is obtained in this way in relation to the weight of the plug-and-socket coupling.

When the socket has a plurality of uniformly-distributed external wall-surface ribs, these should extend substantially along the axial length of spring strips collectively surrounding the socket in the spaces between adjacent ones of the spring strips and have substantially the same dimension in the radial direction as the spring strips. In such an embodiment, the ribs complement the spring strips to form a smooth surface by filling in the spaces between the spring strips when the plug and socket are in the assembled, coupling condition. The likelihood of an undesired accumulation of dirt is then minimized.

The latch surface on the socket which cooperates with the preferred, detent latch surface of the plug to latch the plug-and-socket coupling together advantageously is one or more latch ribs projecting externally from the socket body remote from its open, plug-receiving end and extending perpendicularly to the axial direction of relative movement for latching the plug and socket together into the coupling. An embodiment so designed offers the advantage that engagement of the latching means entails only a momentary deformation of the spring strip during the attaching and detaching movements. There is also a further advantage of strengthening the wall of the socket with the transverse extent of the latch rib. Preferably, there is a latch rib for each spring strip of the plug distributed uniformly about the circumference of the socket. These are advantageously spaced by the external longitudinal, wall-surface ribs of the anti-twisting structure.

One of the latch surfaces of the plug and socket should make an acute angle with the axis thereof. The angle should be not more than 75 degrees and, more preferably, between 35 and 60 degrees. In such an embodiment, the end face of the spring strip preferably is also appropriately beveled on the inside. When the two, plug and socket parts are joined together as the coupling, therefore, the spring strip is readily able to slide over the rib.

Consistent with what has been said above, it is also possible to provide a plurality of latch ribs.

The plug is preferably hollow for weight reduction without appreciable stability impairment.

The plug-and-socket coupling in accordance with the invention is not only simple to manufacture but, because of its stability, is also very easy to handle. In addition, it is highly wear-resistant and of low weight, which makes it universally suited for use whenever a handle is to be attached to an implement.

BRIEF DESCRIPTION OF THE DRAWINGS

A preferred plug, socket and plug-and-socket coupling thereof which illustrate but do not limit the invention will now be described in greater detail with reference to the accompanying drawing, wherein:

FIG. 5 is an elevation of the coupling of FIG. 1;

FIG. 6 is a bottom, cross-sectional view of the coupling of FIG. 5; and

FIG. 7 is a sectional elevation of the coupling of FIG. 5.

DETAILED DESCRIPTION OF THE INVENTION

Figure 1:
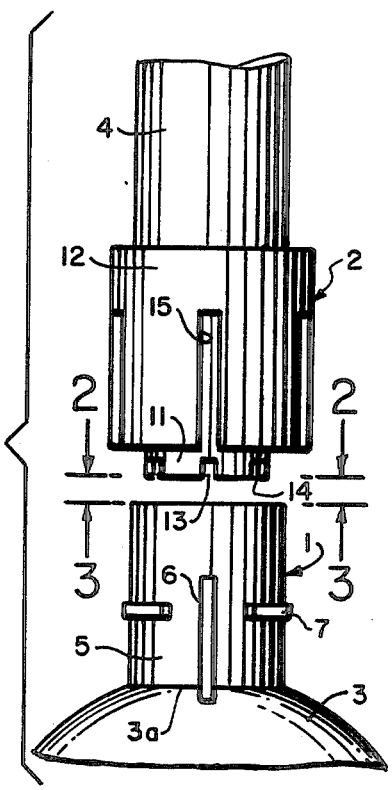
FIG. 1 is an exploded elevation of the coupling of the plug and socket.
Figure 2:
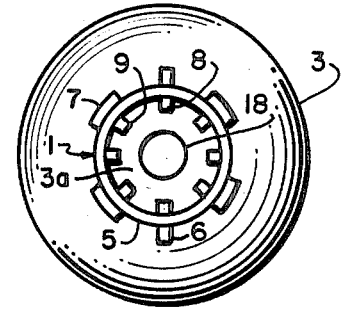
FIG. 2 is a plane view of the socket of FIG. 1.
Figure 3:
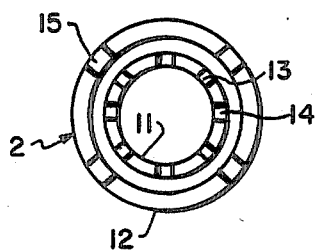
FIG. 3 is a bottom view of the plug of FIG. 1.

As shown in the FIGS., the socket at 1 and plug at 2 each have hollow cylindric bodies 5, 11 interrupted at only a few, corresponding, rotationally-symmetric points by notches or ribs, respectively. They are produced separately by injection molding any appropriate material but are preferably made from polyvinyl chloride or polypropylene. All the external surfaces of the plug and socket, including a flange and ribs respectively thereof, are coaxially cylindric with the plug and socket, respectively.

The socket at 1, has a device 3 for attachment to a portion of an implement such as, for example, the string-holding device (not shown) of a string mop. The cylindric socket body 5 axially projects from one end on the device 3 to an opposite, axis-normal, open end for first receiving the plug upon relative axial movement. The device 3 extends substantially across the end of the socket body to form a base section 3a of the socket body for reinforcing it. The base section has a central opening 18 for a fastener to the implement in the device 3. A diametrically-opposite pair of ribs 6 extend axially along the outside of the cylinder from the base-section end of the socket and project outwardly to form an anti-twisting feature. The anti-twisting ribs 6 also stiffen the cylindric socket body axially and pass as a unit into the base section 3a for further stiffening. Two sets of four, further, axial anti-twisting ribs 8, 9 are symmetrically and alternately arranged similarly around the inside of the cylindric socket body. These are axially shorter than the ribs 6, and ribs 8 are also shorter than ribs 9. Two of the ribs 8 align with the ribs 6 to augment their stiffening functions. The outside of the cylindric socket body 5 also has integral latch ribs 7 which extend perpendicularly its axis. The anti-twisting ribs 6 extend farther from the base section of the socket than the latch ribs 7.

The plug at 2 has a device 4 on one end of its cylindric plug body 11 for attachment to a handle such as a broomstick, for example. The device is, therefore, a hollow, open-ended cylinder. The other end of the cylindric plug body 11 has two sets of four, axial notches 13, 14 symmetrically and alternately arranged around the cylindric plug body. These receive the anti-twisting ribs 8,9 of the cylindric socket body when the plug is inserted therein and, therefore, have widths, spacings and different lengths corresponding thereto.

Figure 4:
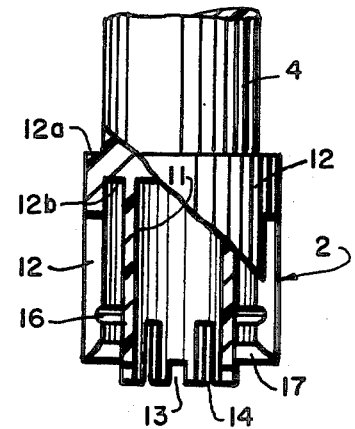
FIG. 4 is an elevation of the plug of FIG. 1, partly cut-away and in section.

A flange 12a (FIGS. 4 and 7) integrally projects radially from the one end of the cylindric plug body having the device 4 for receiving the handle. It has an axis-normal, annular surface 12b on its plug-body side for support of the corresponding, axis-normal, open end of the socket body as shown in FIG. 7 when the plug and socket are coupled. This provides particularly durable and stable support for the socket body end.

An annular spring strip 12 integrally projects toward the end of the plug from the flange 12a. The spring strip extends parallel to the axis of the cylindric plug body substantially the full length of the plug body to an opposite end having a flange-directed, inner bevel 17.

The spring strip has two, diametrically-opposite notches 15 for receiving the anti-twisting ribs 6 of the socket when coupled thereto. The notches 15 also contribute to radial resilience of the spring strip.

The spring strip has detents 16 spaced about its inner side, facing and normal to the axis of the plug body and axially spaced along the plug body to receive the latching ribs 7 of the socket. The detents are curved to present an acute, about 55° angle to the axis of the plug and the latching ribs 7 for detachment merely by sufficient force. The end of the spring strip 12 remote from the flange has an entry bevel 17 toward the flange to pass over the latching ribs upon coupling movement of the plug and socket. The annular inside of the spring strip and its detent are dimensioned relative to the socket such that the spring strip is only sprung as its portion between the beveled end and detent passes over the latching rib 7 during coupling or decoupling movement. Then the detent 16 snaps over the latching rib 7 to the position shown in FIG. 7 to hold the plug and socket together as a coupling.

It will be appreciated that the instant specification and claims are set forth by way of illustration and not of limitation, and that various changes and modifications may be made without departing from the spirit and scope of the present invention.

What is claimed is:

1. A plug for a coupling for temporarily attaching a handle to an implement, said plug being adapted to mate with a coaxial socket and comprising:

a cylindric plug body;

an attachment device on one end of the plug body for attaching the plug to one of the handle and implement;

a flange projecting generally radially from the one, attachment-device end of the plug body having an annular surface, which is externally cylindric coaxially with the plug body and substantially normal to the axis of the plug body, for engaging the socket of the coupling;

at least one spring strip projecting from the flange parallel to the axis of the plug body substantially along the length of the plug body and radially spaced from the plug body by the radial width of the annular, socket-engaging surface of the flange;

at least one latching means on the inside of the spring strip facing the plug body substantially spaced along the spring strip from the flange and extending transversely to the axis of the plug body; and at least two notches on the spring strip extending axially of the plug body to open ends thereof remote from the flange, the closed end of at least one notch being closer to the flange than the latching means of the plug;

whereby the placement of said at least one notch enables said spring strip to flex in the region of said latching means.

2. A socket for a coupling for temporarily attaching a handle to an implement, comprising:

a cylindric, tubular socket body;

an attachment device on one end of the socket body for attaching the socket to one of the handle and implement;

a surface on the other end of the socket body which is substantially normal to the axis of the socket body for engaging a corresponding surface on a plug of the coupling;

at least one latching means on the outside of the socket body closer to the one, attachment-device end of the socket body than its other end and extending transversely to the axis of the socket body; and at least two, axial ribs extending radially from the socket body from at least proximate the one, attachment-device end of the socket body, at least one of the ribs extending farther from the one, attachment-device end of the socket body than the latching means thereof;

whereby the selected length of said at least one rib, which extends farther from said one end of the socket than said latching means, serves to hold said socket from rotating with respect to a plug body when said latching means is being engaged.

3. A plug-and-socket coupling for temporarily attaching a handle to an implement, comprising:

a cylindric plug body of said plug;

an attachment device on one end of the plug body for attaching the plug to one of the handle and implement;

a flange projecting generally radially from the one, attachment-device end of the plug body having an annular surface, which is externally cylindric coaxially with the plug body and substantially normal to the axis of the plug body;

at least one spring strip projecting from the plug-body side of the flange parallel to the axis of the plug body substantially along the length of the plug body and radially spaced from the plug body by the radial width of th annular surface of the flange;

at least one latching means on the inside of the spring strip facing the plug body substantially spaced along the spring strip from the flange and extending transversely to the axis of the plug body;

at least two notches on at least one of the plug body and spring strip extending axially of the plug body to open ends thereof remote from the flange, the notches being of different lengths from their open ends and the other, closed end of at least one notch being closer to the flange than the latching means of the plug;

a cylindric, tubular socket body of said socket;

an attachment device on one end of the socket body for attaching the socket to the other of the handle and implement;

a surface on the other end of the socket body which is substantially normal to the axis of the socket body for engaging the annular surface of plug body;

at least one latching means on the outside of the socket body closer to the one, attachment-device end of the socket body than its other end and extending transversely to the axis of the socket body, the latching means on the socket body being positioned and dimensioned cooperatively with that on the spring strip for latching together when the surface on the other end of the socket body engages the annular surface of the plug body; and at least two, axial ribs extending radially from the socket body from at least proximate the one, attachment-device end of the socket body, the ribs being of different lengths and at least one of the ribs extending farther from the one, attachment-device end of the socket body than the latching feature thereof, the ribs being positioned and dimensioned cooperative with the notches.

4. The plug of claim 1, wherein the spring strip projects the full axial length of the plug body from the flange.

5. The coupling of claim 3, wherein the spring strip projects the full axial length of the plug body from the flange.

6. The socket of claim 2, wherein at least one of the ribs extends radially from the outside of the socket body and is externally cylindric coaxially with the socket body.

7. The coupling of claim 3, wherein at least one of the ribs extends radially from the outside of the socket body and is externally cylindric coaxially with the socket body and at least one of the notches is in the spring strip for receiving it.

8. The coupling of claim 5, wherein at least one of the ribs extends radially from the outside of the socket body and is externally cylindric coaxially with the socket body and at least one of the notches is in the spring strip for receiving it.

9. The socket of claim 2, wherein at least one of the ribs extends radially from the outside of the socket body.

10. The coupling of claim 3, wherein at least one of the ribs extends radially from the outside of the socket body and at least one of the notches is in the spring strip for receiving it.

11. The coupling of claim 5, wherein at least one of the ribs extends radially from the outside of the socket body and at least one of the notches is in the spring strip for receiving it.

12. The coupling of claim 3, wherein the latching means comprise a rib on one of the plug and socket bodies and a cooperative detent on the other.

13. The coupling of claim 11, wherein the latching means comprise a rib on one of the plug and socket bodies and a cooperative detent on the other.

14. The plug of claim 1, wherein at least one of the notches is in the other end of the plug body from the one, attachment-device end.

15. The coupling of claim 3, wherein at least one of the notches is in the other end of the plug body from the one, attachment-device end and at least one of the ribs extends radially from the inside of the socket body for receipt therein.

16. The coupling of claim 13, wherein at least one of the notches is in the other end of the plug body from the one, attachment-device end and at least one of the ribs extends radially from the inside of the socket body for receipt therein.

* * * * *